United States Patent
Schmalenberg et al.

(10) Patent No.: US 10,536,223 B2
(45) Date of Patent: Jan. 14, 2020

(54) PHASE MODULATED OPTICAL WAVEGUIDE

(71) Applicant: Toyota Motor Engineering & Manufacturing North America, Inc., Erlanger, KY (US)

(72) Inventors: Paul Donald Schmalenberg, Ann Arbor, MI (US); Tsuyoshi Nomura, Novi, MI (US); Jae Seung Lee, Ann Arbor, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 9 days.

(21) Appl. No.: 15/878,905

(22) Filed: Jan. 24, 2018

(65) Prior Publication Data
US 2019/0229814 A1    Jul. 25, 2019

(51) Int. Cl.
| | |
|---|---|
| H04B 10/04 | (2006.01) |
| H04B 10/70 | (2013.01) |
| G01S 7/491 | (2006.01) |
| G01S 17/10 | (2006.01) |

(52) U.S. Cl.
CPC ............... H04B 10/70 (2013.01); G01S 7/491 (2013.01); G01S 17/10 (2013.01)

(58) Field of Classification Search
CPC .................. H04B 10/70; H04B 10/505; H04B 10/50575; H04B 10/50577; H04B 10/50597; H04B 10/548; H04B 10/25; G01S 7/491; G01S 17/10; G02F 1/025; G02F 2203/50; G02F 1/225; G02F 1/292; G02F 1/2955; G02F 2203/24; G02F 2203/20; G02F 1/011; G02F 1/0115

USPC .......................... 398/141, 188, 198, 200, 183
See application file for complete search history.

(56) References Cited

U.S. PATENT DOCUMENTS

| | | | | |
|---|---|---|---|---|
| 5,059,008 A | * | 10/1991 | Flood | G02B 3/0056 349/202 |
| 5,093,747 A | * | 3/1992 | Dorschner | G02F 1/292 359/315 |
| 5,770,472 A | * | 6/1998 | Zhou | G02B 6/12004 438/24 |
| 5,930,031 A | * | 7/1999 | Zhou | G02B 6/12004 359/344 |
| 5,943,159 A | * | 8/1999 | Zhu | G02F 1/292 359/254 |
| 6,188,808 B1 | * | 2/2001 | Zhou | G02B 6/12004 385/14 |
| 6,317,536 B1 | * | 11/2001 | Bhagavatula | G02B 6/12011 385/129 |
| 6,509,812 B2 | | 1/2003 | Sayyah | |

(Continued)

*Primary Examiner* — Hibret A Woldekidan
(74) *Attorney, Agent, or Firm* — Christopher G. Darrow; Darrow Mustafa PC (57) ABSTRACT

System, methods, and other embodiments described herein relate to a photonic apparatus. The photonic apparatus including a phase shifter that modulates a light wave propagated within the phase shifter by progressively shifting a phase of the light wave along a length of the phase shifter. The photonic apparatus includes optical outputs operably connected with the phase shifter at intervals along the length of the phase shifter. The optical outputs provide the light wave with different phases according to the intervals at which the optical outputs are spaced on the phase shifter.

20 Claims, 4 Drawing Sheets

(56) References Cited

U.S. PATENT DOCUMENTS

| | | | |
|---|---|---|---|
| 6,922,510 B2* | 7/2005 | Hatanaka | G02B 6/12004 385/37 |
| 8,200,055 B2 | 6/2012 | Subbaraman et al. | |
| 8,483,521 B2* | 7/2013 | Popovic | G02B 6/29338 385/15 |
| 8,508,408 B2 | 8/2013 | Quan et al. | |
| 8,861,983 B2 | 10/2014 | Dickerson | |
| 8,923,660 B2* | 12/2014 | Dorin | G02B 6/2766 385/1 |
| 8,988,754 B2* | 3/2015 | Sun | G02B 6/26 359/238 |
| 9,217,883 B2* | 12/2015 | Kato | G02F 1/011 |
| 9,425,899 B2* | 8/2016 | Sekiguchi | G02F 1/0123 |
| 9,476,981 B2 | 10/2016 | Yaacobi et al. | |
| 9,746,698 B2* | 8/2017 | Goodwill | G02F 1/011 |
| 2004/0081386 A1* | 4/2004 | Morse | G02B 6/12007 385/15 |
| 2012/0013962 A1* | 1/2012 | Subbaraman | B82Y 20/00 359/15 |
| 2014/0355925 A1* | 12/2014 | Manouvrier | G02F 1/025 385/3 |
| 2015/0346340 A1* | 12/2015 | Yaacobi | G01S 17/36 356/5.11 |
| 2015/0355313 A1* | 12/2015 | Li | G01S 13/726 342/195 |
| 2016/0036532 A1* | 2/2016 | Noguchi | H04B 10/50572 398/38 |
| 2017/0315420 A1* | 11/2017 | Watts | G02B 6/1223 |
| 2018/0205465 A1* | 7/2018 | Tanaka | H04B 10/524 |
| 2019/0170875 A1* | 6/2019 | Schmalenberg | G01S 17/32 |
| 2019/0219888 A1* | 7/2019 | Sun | G02F 1/2955 |

\* cited by examiner

PHASE MODULATED OPTICAL WAVEGUIDE

TECHNICAL FIELD

The subject matter described herein relates in general to a silicon photonic device and, more particularly, to a phase shifter that is comprised of a continuously modulated optical waveguide to provide a progressive phase change in a light wave along a length of the phase shifter.

BACKGROUND

Environmental perception can be a challenge for electronic devices. For example, electronic devices that operate autonomously such as robots and vehicles generally use one or more sensors to perceive a surrounding environment so that the devices can determine a location within the environment and map objects and obstacles. In this way, the autonomous electronic devices can determine paths through the environment when autonomously navigating and/or provide assistance to an operator in order to avoid objects or otherwise map the environment. However, sensors such as light/laser detection and ranging (LIDAR/LADAR) sensors can be cumbersome due to large sizes/weights associated with such devices and moving parts that, for example, rotate in order to provide a wide scanning field. Moreover, complex control systems associated with arrays of phase shifters can add to the complexity of control logic design and, thus, also affect costs through increased chip area and difficulties associated with implementing such complex systems.

SUMMARY

An example of a photonic device that is configured with a single discrete phase shifter that progressively shifts a phase of a light wave along a length of the phase shifter is presented herein. In one embodiment, the continuous phase shifter is implemented such that optical outputs are coupled with the phase shifter at intervals along the phase shifter. The placement of the optical outputs along the phase shifter causes the respective optical outputs to couple the light wave with distinct phases. The phase shifter produces the light waves with the distinct phases by progressively changing (i.e., shifting) a phase of the light wave as the light wave propagates along a length of the phase shifter. For example, the phase shifter provides for a change in phase of δ radians per x units of length (e.g., per nm) of the phase shifter. Therefore, by locating the optical outputs at particular locations along the phase shifter, different phase changes can be coupled onto the respective optical outputs. Consequently, a single discrete phase shifter that continuously shifts a phase of the light wave can be implemented in place of an array of phase shifters that comprises many discrete phase shifters providing a singular finite phase shift.

Moreover, in one embodiment, the phase shifter can be dynamically controlled to provide a different amount of phase shift between the intervals through the application of thermal energy to the phase shifter. In this way, a single continuous phase shifter can replace the noted array and thereby improve control complexity and associated costs. Additionally, associated devices, such as solid-state LIDAR devices that may implement arrays of phase shifters also realize the noted improvements by replacing a plurality of discrete phase shifters with a continuous phase shifter as discussed herein.

In one embodiment, a photonic apparatus is disclosed. The photonic apparatus includes a phase shifter that modulates a light wave propagated within the phase shifter by progressively shifting a phase of the light wave along a length of the phase shifter. The photonic apparatus includes optical outputs operably connected with the phase shifter at intervals along the length of the phase shifter. The optical outputs provide the light wave with different phases according to the intervals at which the optical outputs are spaced on the phase shifter.

In one embodiment, an optical device is disclosed. The optical device includes an optical waveguide operably connected with a light source. The optical waveguide modulating a light wave from the light source. The optical device includes optical outputs operably connected with the optical waveguide at intervals along a length of the optical waveguide. The optical outputs coupling the light wave from the optical waveguide at the intervals to produce a plurality of light waves with different characteristics as a function of the modulating by the optical waveguide. The optical device includes a heater that produces thermal energy and applies the thermal energy to the optical waveguide.

In one embodiment, a method for dynamically controlling a continuous phase shifter is disclosed. The method includes, in response to an electronic control signal that indicates a requested direction in which to steer a beam of light, adjusting, using a heater operably connected with the continuous phase shifter, an amount of thermal energy provided to the continuous phase shifter. The method includes continuously modulating a phase of a light wave as the light wave propagates along a length of the continuous phase shifter and as a function of the thermal energy. The method includes coupling, from the continuous phase shifter via optical outputs spaced at intervals along the continuous phase shifter, a plurality of distinct waves with distinct phases formed by the optical outputs coupling the light wave at the intervals.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Systems, methods and other embodiments associated with a phase shifter comprised of a continuously phase modulated optical waveguide are disclosed herein. As previously noted, devices such as LIDAR sensors can include arrays of discrete phase shifters that separately modulate a light wave to produce light waves with distinct phases. However, implementing arrays of phase shifters can be complex and, thus, can contribute to increased use of chip area. Accordingly, implementing arrays of discrete phase shifters can be costly.

Therefore, in one embodiment, a photonic apparatus includes an integrated continuous phase shifter in place of an array of phase shifters. For example, the integrated continuous phase shifter generates output light waves at separate optical outputs along a length of the phase shifter and with distinct phases. In one aspect, the integrated phase shifter is a continuously phase modulated optical waveguide. That is, the phase shifter is comprised of an optical waveguide that continuously and progressively modulates a phase of a light wave propagated therein. In other words, the phase shifter modulates the light wave by a particular amount of phase change per unit of length (e.g., per nm) of the phase shifter. Thus, the integrated phase shifter is continuously changing a phase of the light wave as the light wave propagates along the phase shifter. As a result, the light wave accumulates phase change as a result of propagating over a length of the phase shifter.

Accordingly, in one embodiment, optical outputs are coupled with the phase shifter at defined intervals along the length of the shifter to couple or otherwise split the light wave from the phase shifter with distinct phases. Consequently, the integrated continuous phase shifter can provide the light wave with multiple distinct phases simultaneously instead of using separate discrete phase shifters to independently modulate the light wave. Moreover, in further aspects, additional control components such as a heater and control circuitry are provided along with the phase shifter so that the amount of phase change per unit length induced by the phase shifter can be adjusted. Thus, the phase shifter can generate different phases of the light wave at respective ones of the optical outputs. In this way, a single integrated phase shifter is provided that avoids difficulties associated with complex control systems used along with an array of separate phase shifters.

Figure 1:
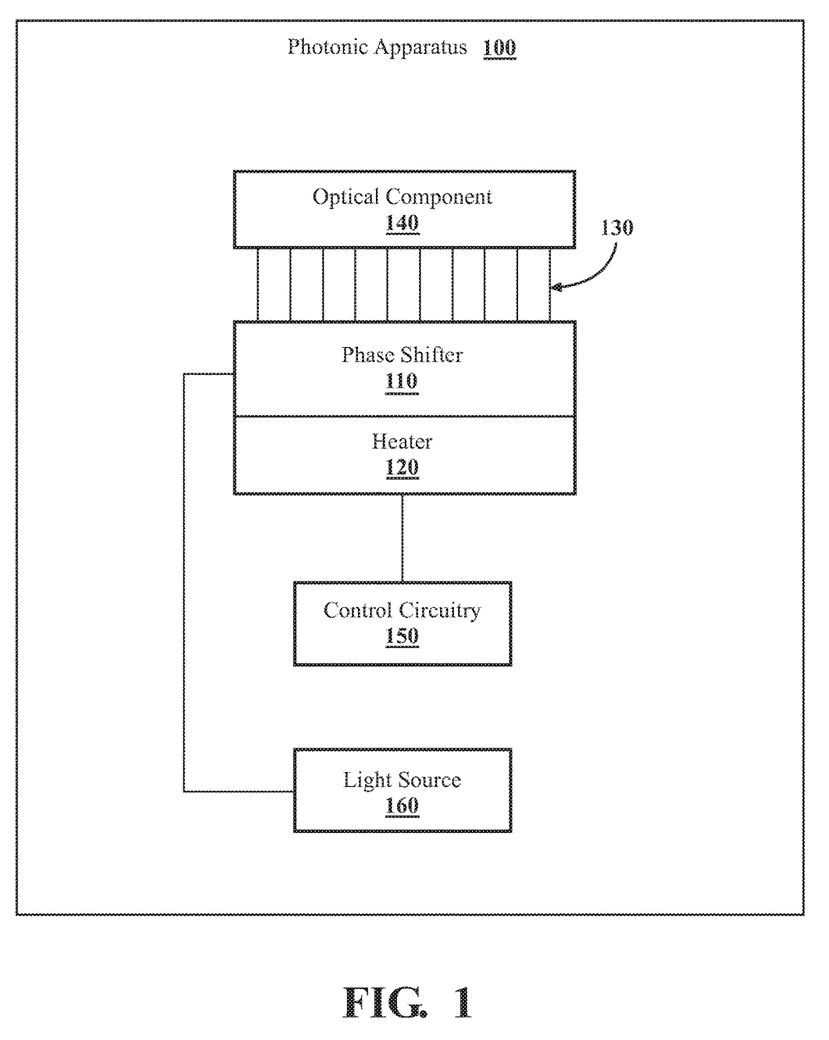
FIG. 1 is a block diagram illustrating one embodiment of a photonic apparatus that includes a phase shifter configured to progressively shift a phase of a light wave.

Referring to FIG. 1, an example of a photonic apparatus 100 is illustrated. As an initial matter, while the photonic apparatus 100 is generally discussed as being included within a LIDAR, the disclosed photonic apparatus can, in further aspects, also be implemented in other optical systems as, for example, a replacement of an array of phase shifters. Thus, the embodiments disclosed herein are not limited to LIDAR sensors. Moreover, the disclosed photonic apparatus 100 is generally discussed as being implemented along with electronic devices such as robots, vehicles, and so on; however, it should be appreciated that the disclosed devices, systems, and methods can be integrated with the noted devices or can be provided as standalone components. Additionally, as used herein, a "vehicle" is any form of motorized transport. In one or more implementations, a vehicle refers to an automobile. While arrangements will be described herein with respect to automobiles, it will be understood that embodiments are not limited to automobiles. In some implementations, the vehicle may be any other form of motorized transport that, for example, benefits from data provided via the photonic apparatus 100.

As an additional note, the photonic apparatus 100 also includes various elements. It will be understood that in various embodiments it may not be necessary for the photonic apparatus 100 to have all of the elements shown in FIG. 1. The photonic apparatus 100 can have any combination of the various elements shown in FIG. 1. Further, the photonic apparatus 100 can have additional elements to those shown in FIG. 1. In some arrangements, the photonic apparatus 100 may be implemented without one or more of the elements shown in FIG. 1. Further, while the various elements are shown as being located within the photonic apparatus 100 in FIG. 1, it will be understood that one or more of these elements can be located external to the photonic apparatus 100. Further, the elements shown may be physically separated by varying distances.

Some of the possible elements of the photonic apparatus 100 are shown in FIG. 1 and will be described along with subsequent figures. However, for purposes of brevity of this description some elements that may be included within the photonic apparatus 100 have been omitted from FIG. 1 and the associated discussion. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements.

In either case, the photonic apparatus 100 includes a phase shifter 110 that is implemented, in one embodiment, as an optical waveguide that modulates a light wave propagating therein in a continuous and progressive manner. Accordingly, the phase shifter 110 is coupled with optical outputs 130 at defined intervals along a length of the phase shifter 110 such that as the light wave is coupled from the phase shifter 110 at successive ones of the optical outputs 130, a phase of the light wave is distinct from the light wave coupled at previous ones of the optical outputs 130.

FIG. 1 further illustrates an optical component 140 that is an optical antenna (e.g., phased-array antenna), optical grating or other optical structure that receives light from the phase shifter 110 through the optical outputs 130. Furthermore, the photonic apparatus 100 also includes a heater 120 that is operably connected with control circuitry 150. It should be noted that while the heater 120 is illustrated, in further aspects, a separate device is substituted for the heater 120 to provide electro-optic control of the phase shifter 110. Thus, in one embodiment, the phase shifter 110 is implemented as an optical waveguide that includes n-type and p-type doped regions. Accordingly, in one embodiment, the control circuitry 150 can cause a bias current to be applied across the phase shifter 110 thereby inducing the phase shifter 110 to electro-optically modulate a phase of a light wave propagating therein in a continuous manner along a length of the phase shifter 110. In general, the bias current functions to attract and/or expel carriers from the optical waveguide (i.e., the phase shifter 110) thereby inducing the phase shift. In general, whether the heater 120 or an electro-optic component is implemented is determined according to characteristics of a particular implementation. Moreover, in one aspect, both the heater 120 and the electro-optic component can be implemented to provide for a mixed use.

The control circuitry 150 functions to control the heater 120 to produce a particular amount of thermal energy, and provide the thermal energy to the phase shifter 110. That is, because an amount of phase shift induced within the light wave per unit length of the phase shifter 110 can be controlled as a function of a present temperature, the control circuitry 150 controls the heater 120 to provide thermal energy according to an amount of phase change that is desired. In various configurations, the control circuitry 150 controls the heater 120 by varying an amount of electric power conducted to the heater 120, by providing an electronic control signal that indicates an amount of thermal energy for the heater 120 to generate, or by another control mechanism. Additionally, in one embodiment, the heater 120 is placed proximate to (e.g., along a side of the phase shifter 110) or, in another embodiment, is placed within a footprint of the phase shifter 110 in a separate layer of the photonic apparatus 100. Alternatively, or additionally, the heater 120 can be integrated with the phase shifter 120 as will be discussed further subsequently.

In either case, the phase shifter 110 receives the noted light wave from a light source 160. The light source 160 is a laser or other light source used with silicon photonic devices. Accordingly, a wavelength and other characteristics of a light wave from the light source 160 can be controlled either dynamically or as a particular aspect of implementation. As a further matter, it should be noted that reference to light waves, optical signals, and light all generally refer to electromagnetic radiation having a particular wavelength. For example, as discussed herein the light wave is infrared light (e.g., 1550 nm) or a similar wavelength. In further aspects, the particular wavelength of light may be varied according to particular aspects of the implementation. Moreover, the light source 160 generally produces the light wave with a particular phase.

In either case, the phase shifter 110 receives the light wave from the light source 160 at an input. The input to the phase shifter is generally at one end of the phase shifter 110 so that the light wave can be shifted along a full length of the phase shifter 110. However, in further implementations, the input can be located anywhere along the phase shifter 110 so long as the light wave is propagated into the phase shifter 110 and, for example, without significant attenuation. The optical outputs 130 are generally arranged at regular intervals along the phase shifter 110 in order to provide the light wave as separate outputs with distinct phases that are related in a particular pattern or phase profile (e.g., arrangement of phases). In further implementations, the optical outputs 130 can be placed at irregular intervals or in locations along the phase shifter 110 that are selected to provide for coupling the light wave from the phase shifter 110 at particular phases.

For example, in one embodiment, the optical outputs 130 can include different patterns of optical outputs 130 (e.g., different spacing along the phase shifter 110), which are selectively and dynamically activated to provide outputs from the phase shifter 110. That is, the optical outputs 130 can include a first set of outputs and a second set of outputs with at least one of the sets being connected with the optical component 140 at a time. Alternatively, in one embodiment, each of the optical outputs 130 can be independently and selectively switched to couple light from the phase shifter 110 to the optical component 140 or selectively switched off such that a particular one or more of the optical outputs 130 does not couple light to the optical component 140. The particular configuration of the optical outputs 130 is generally customizable according to aspects of the implementation, and, thus, should not be construed as being limited to a particular configuration in regards to placement about the phase shifter 110. However, for purposes of this discussion the optical outputs 130 are generally discussed as being placed at defined regular intervals along the phase shifter 110.

Moreover, the phase shifter 110 itself is generally an optical waveguide that is comprised of a silicon-based compound, or another suitable compound with characteristics that facilitate use as an optical waveguide that modulates light. Additionally, it should be noted that the photonic apparatus 100 is a chip-scale silicon photonic device. In one embodiment, the silicon photonic device 100 is further integrated with CMOS integrated circuit devices (e.g., control circuitry 150) to provide additional functionality. In either case, the discussed waveguides, such as the phase shifter 110, the optical outputs 130, and so on are structures that are transparent to a wavelength of light carried therein. Moreover, the discussed operable connections are, in one embodiment, couplings between two or more waveguides.

Figure 2:
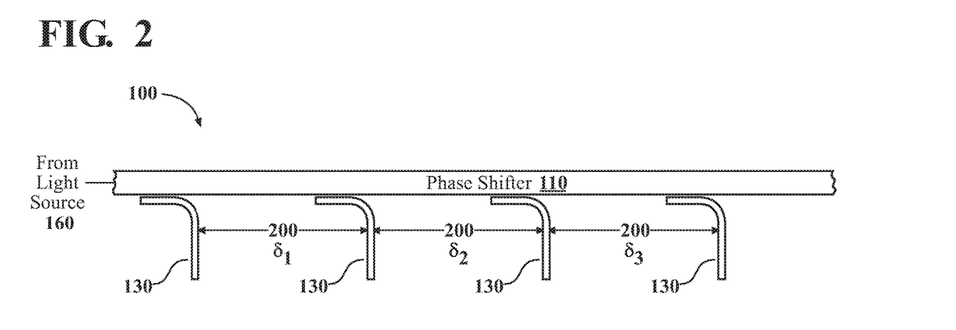
FIG. 2 is a diagram illustrating one embodiment of a continuous phase modulated optical waveguide.

As further explanation, consider FIG. 2 and a general configuration of the phase shifter 110. As illustrated in FIG. 2, the photonic apparatus 100 includes four separate optical outputs 130 coupled with the phase shifter 110. Of course, the phase shifter 110 is illustrated with four optical outputs 130 for purposes of illustration and can include a different number of optical outputs 130 in various implementations. Moreover, for purposes of illustration, the couplings between the optical outputs 130 and the phase shifter 110 are shown as a direct connection. However, in general the coupling is an evanescent coupling that couples light from the phase shifter 110 at a particular location along the phase shifter 110 and thus with a distinct phase as modulated by the phase shifter 110 from the light propagating through a medium of the phase shifter. In this way, the optical outputs 130 can provide the light wave with varied phases from the phase shifter 110 and, thus, the photonic apparatus 100 can direct a beam of light that is emitted from the photonic apparatus 100 in a particular direction in order to, for example, scan a surrounding environment and/or determine information about a particular locality.

In either case, the optical outputs 130 are configured to provide separate light waves with defined phase differences from the phase shifter 110 to the optical component 140. For example, the phase difference between a first one of the optical outputs 130 and a second one of the optical outputs 130 is, for example, $\delta_1$. Accordingly, the phase differences continue between outputs of subsequent ones of the optical outputs 130 such that a phase difference between the second optical output 130 and a third optical output is $\delta_2$, a phase difference between the third optical output and the fourth optical output is $\delta_3$ (e.g., $3\delta_1$), and so on. Moreover, it should be appreciated that phase differences between adjacent outputs 130 is regular and thus phase differences with relation to the first optical output are multiples thereof (e.g. $2\delta_1$, $3\delta_1$, etc.).

Additionally, it should be appreciated that the optical outputs 130 can be arranged in different configurations; however, as discussed herein, the optical outputs 130 are arranged at defined intervals 200 that are generally regular, as shown in FIG. 2. The regular intervals 200 generally refer to a spacing of the optical outputs along a length of the phase shifter 110. That is, because the phase shifter 110 continuously modulates a phase of the light wave along a length of the phase shifter 110, placing the optical outputs at regular intervals 200 provides for coupling the light with regular differences in the respective phases. For example, the regular spacing can produce distinct phases at each of the optical outputs that are offset by 30 degrees, 45 degrees, 90 degrees, or another regular amount of phase shift that is determined according to, for example, particular aspects of the implementation.

As a further matter, the amount of phase change provided along the phase shifter 110 can be varied according to thermo-optic control, and/or electro-optic control. That is, the refractive index or permittivity of the optical waveguide that forms the phase shifter 110 can be varied in order to change an amount of phase modulation that is provided per unit length of the phase shifter 110. Thus, as previously indicated, in various embodiments, the phase shifter 110 includes the heater 120 or another component that provides thermal energy or varies an electric field in relation to the phase shifter 110 in order to adjust an amount of phase modulation produced by the phase shifter 110.

Moreover, in further embodiments, the photonic apparatus 100 can include separate sets of optical outputs 130 that are selectively activated/deactivated and/or individual ones of the optical outputs 130 can be switched in order to provide desired phase patterns of the light wave to the optical component 140 as may be desired when controlling a direction of a beam of light in a phased-array LIDAR device. In either case, the phase shifter 110 includes a phase shifting profile that is substantially constant along a length of the phase shifter 110. Of course, in further aspects, the phase shifting profile may be varied along a length of the phase shifter 110 to account for characteristics of particular implementations. However, as discussed herein, the phase shifter 110 provides a generally constant extent of phase shift throughout.

Figure 3:
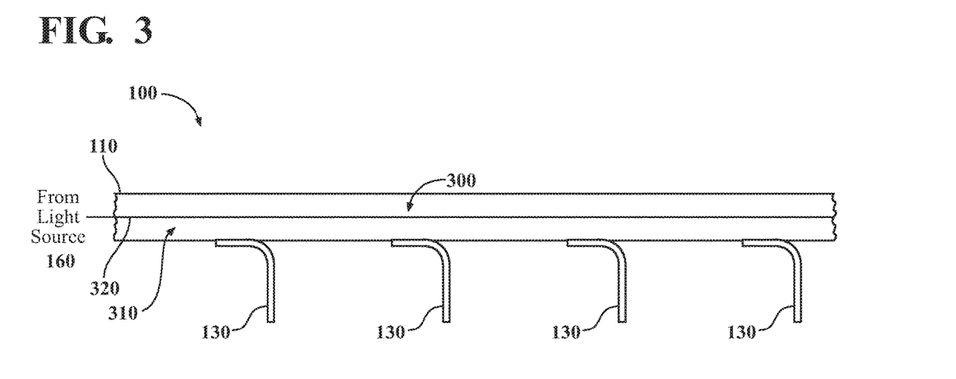
FIG. 3 illustrates one embodiment of a phase shifter implemented using an optical waveguide that includes an integrated heater.

With reference to FIG. 3, one embodiment, of the phase shifter 110 is illustrated that includes the heater 120 embedded therein. For example, as illustrated, the phase shifter 110 includes two separate regions 300 and 310 separated by a median line 320. The regions 300 and 310 represent sections of the phase shifter 110 that are CMOS materials with opposing n-type and p-type doping that provide for inducing a thermal profile in the phase shifter 110 when a bias is applied to the phase shifter 110. The thermal profile is generally constant along a length of the phase shifter 110, but can also be implemented to be varied in order to achieve different phase profiles (e.g., different amounts of phase shift at different locations along the phase shifter 110) at the separated optical outputs 130. Moreover, the phase shifter 110 can also be implemented with separate doped regions (e.g., multiple segments along the length) and thus multiple biases can be applied to the phase shifter 110 in order to achieved a desired thermal profile. That is, the separate regions can be separately controlled by individually activating the separate regions, providing different biases to the separate regions and so on in order to achieve a desired thermal profile (e.g., temperature variation across the phase shifter 110).

Figure 4:
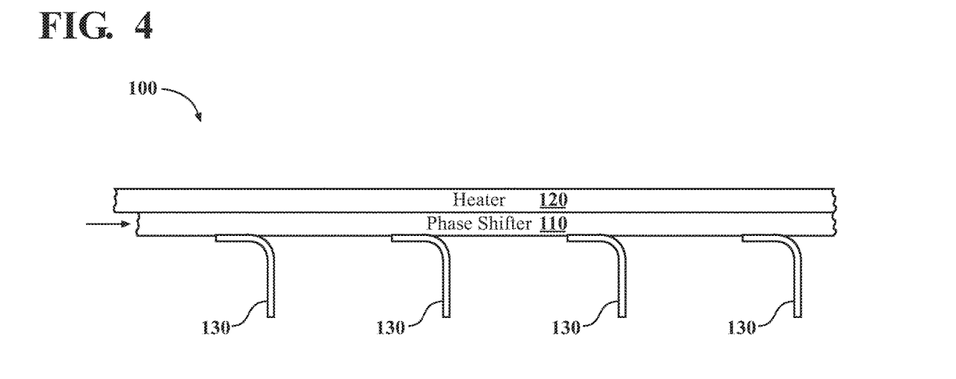
FIG. 4 is a diagram illustrating one embodiment of a phase shifter with an adjacent heater.

By contrast, FIG. 4 illustrates the heater 120 as a separate component. As shown in FIG. 4, the heater 120 is an electrically resistive element that provides thermal energy to the phase shifter 110 as controlled by the control circuitry 150. Moreover, while the heater 120 is generally discussed as applying thermal energy to the phase shifter 110, in one embodiment, the heater 120 is instead an electro-optic mechanism that, for example, varies an electric field about the phase shifter 110 in order to achieve a change in the refractive index and/or permittivity of the substrate that comprises the phase shifter 110. In this way, the photonic apparatus 100 can tune the extent of phase shift provided within the phase shifter 110.

Figure 5:
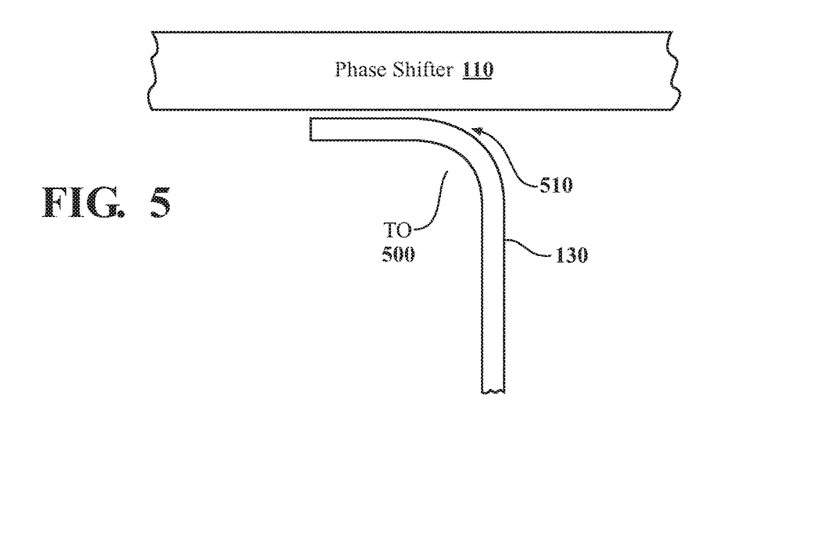
FIG. 5 illustrates one example of an optical output coupled with a phase shifter.

With reference to FIG. 5, one example of a coupling between the phase shifter 110 and one of the optical outputs 130 is illustrated. In general, to evanescently couple one waveguide with another waveguide is to locate the waveguides at a relatively close distance apart such that cross-coupling occurs between the waveguides. That is, when light is propagating through, for example, the phase shifter 110 cross-coupling occurs with the optical outputs 130 such that the light is provided onto the optical outputs 130 while also remaining on the phase shifter 110. In this way, the propagating light is effectively split between both waveguides without substantially diminishing/attenuating the light on the phase shifter 110.

Accordingly, as shown in FIG. 5, a gap 510 exists between the optical output 130 and the phase shifter 110. It should be noted that the efficiency of the coupling between the two waveguides is generally a function of the present temperature at the area of the coupling. Thus, in one embodiment, to ensure that the coupling at each of the optical outputs 130 is relatively similar, each of the optical outputs 130 include a thermos-optic component 500. The thermo-optic component 500 is, for example, a heating element similar to the heater 120, except that the component 500 is local about the point of coupling for each of the optical outputs 130. Thus, in in one embodiment, the thermos-optic component 500 is integrated with respective ones of the optical outputs 130 at the point of coupling to the phase shifter 110. In further embodiments, the thermo-optic component 500 is implemented proximate to (e.g., adjacent) the coupling to provide thermal energy to the general area of the coupling. In this way, the coupling between the phase shifter 110 and the optical outputs 130 is controlled against fluctuations in temperature that can affect coupling efficiency.

Figure 6:
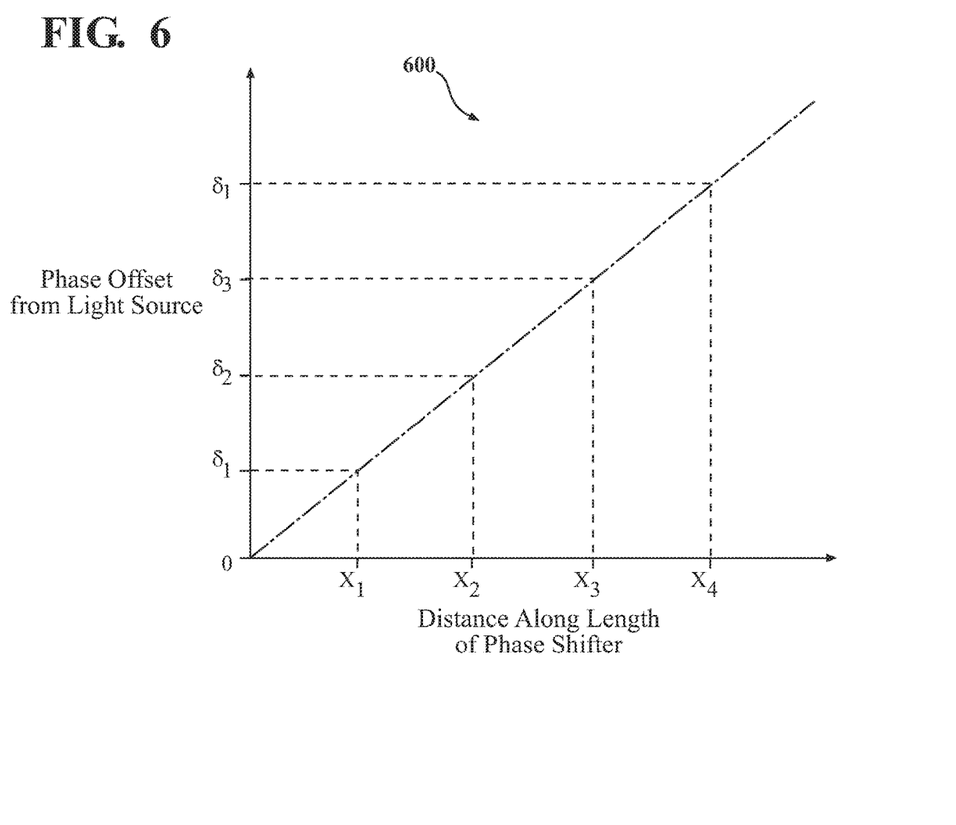
FIG. 6 illustrates a graph of phase shift provided by a phase shifter versus distance along the phase shifter.

With reference to FIG. 6, a graph 600 representing phase change/offset versus distance along the phase shifter 110 is illustrated. As shown in FIG. 6, the separate optical outputs 130 correlate with the distances $x_1$, $x_2$, $x_3$, and $x_4$ along a length of the phase shifter 110. As illustrated, the distances $x_{1-4}$ are substantially regular intervals along the phase shifter 110 and correlate with consistent changes in the phase as shown by phase changes of $\delta_1$, $\delta_2$, $\delta_3$, and $\delta_4$. Thus, the relatively constant phase change along the phase shifter 110 means that the intervals between the optical outputs 130 are regular or even. However, in an instance where the phase change follows a different pattern/profile that does not correlate with a constant rate of change, such as with a curve (not illustrated) within the graph, then the distances between the optical outputs 130 may be irregular or follow a particular function (e.g., $x_n = 2x_{n-1}$). It should be appreciated that the phase change along the phase shifter 110 can include irregularities whether intentional from variations in applied thermal energy or electro-optic control, and/or particular implementation aspects of the phase shifter 110. In either case, the precise location of the optical outputs 130 and thus the intervals between the outputs 130 may be varied to correlate appropriately.

Moreover, other compensation mechanisms may be implemented such as including selectable sets of outputs along the phase shifter 110 as previously noted. In either case, the general configuration of the phase shifter 110 provides continuous phase modulation along a length of the phase shifter 110 and thus provides for replacing many discrete phase shifters of an array with the singular monolithic phase shifter 110 as discussed herein.

Figure 7:
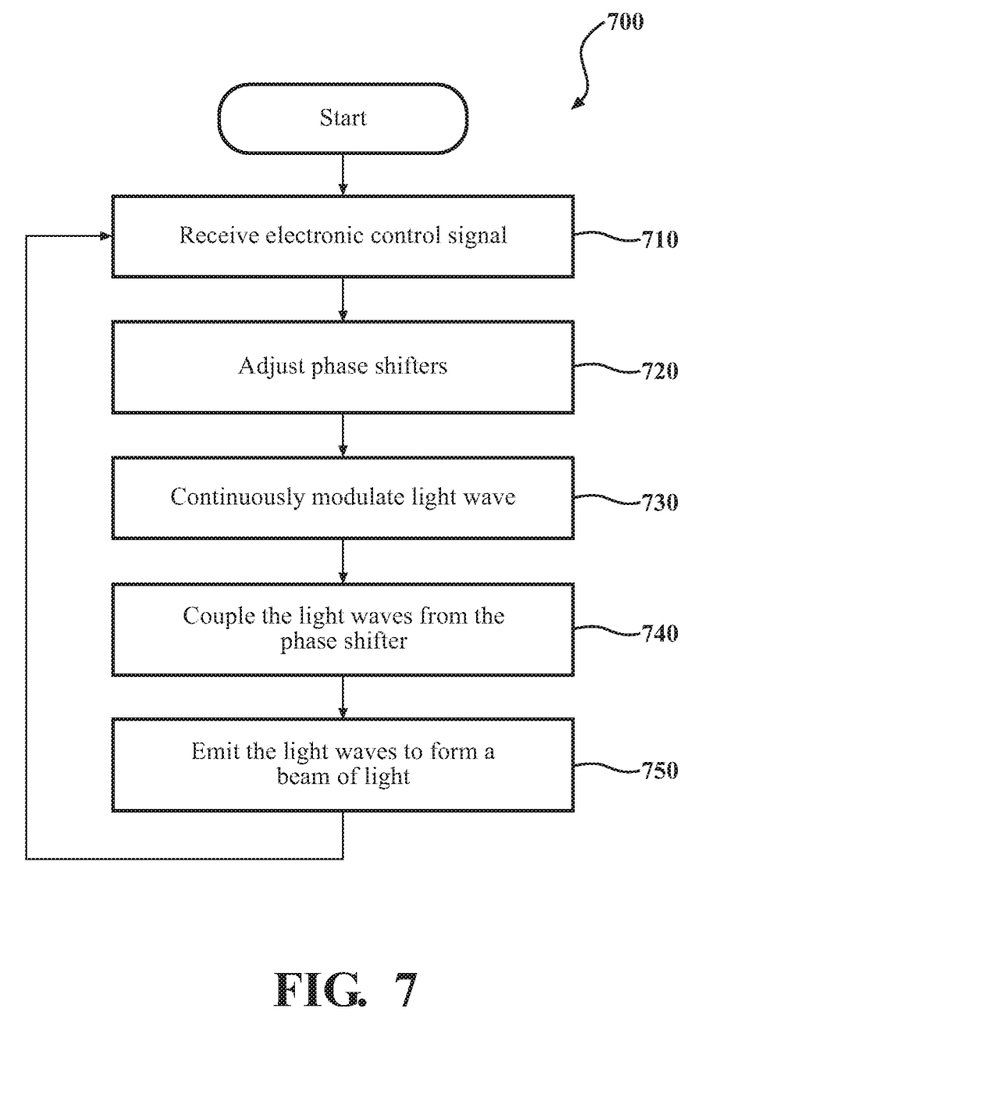
FIG. 7 is a flowchart illustrating one embodiment of a method 700 associated with using a continuously modulated optical waveguide to phase shift a light wave.

Additional aspects of the phase shifter 110 will be discussed in relation to FIG. 7. FIG. 7 illustrates a flowchart of a method 700 that is associated with continuously modulating a light wave to provide output waves with distinct phases while using the single phase shifter 110. Method 700 will be discussed from the perspective of the photonic apparatus 100 of FIG. 1. While method 700 is discussed in combination with the photonic apparatus 100, it should be appreciated that the method 700 is not limited to being implemented within the photonic apparatus 100, but is instead one example of a system that may implement the method 700 and associated components.

At 710, an electronic control signal is received that indicates an extent of phase shift to provide using the phase shifter 110. In one embodiment, the control circuitry 150 receives the electronic control signal from an autonomous driving module, or other electronic entity that processes and/or otherwise uses data produced by the photonic apparatus 100. For example, in one embodiment, the photonic apparatus 100 produces point cloud data about a surrounding environment of the photonic apparatus 100 that is used to detect objects, obstacles, and other aspects of the surrounding environment. The autonomous driving module can use the point cloud data to identify a path through the surrounding environment, identify hazards, track objects, and so on.

In either case, the autonomous driving module can produce the electronic control signal to request sensor data from the photonic apparatus 100 about a particular locality in the surrounding environment, and/or as an update to the sensor data. Alternatively, or additionally, in one embodiment, the electronic control signal is generated internally to the photonic apparatus 100 to cause the control circuitry 150 to regularly scan the surrounding environment in a sweeping and repetitive manner in order to continuously provide an updated view of the surrounding environment. Accordingly, the electronic control signal generally indicates a phase pattern of multiple light waves that are to be emitted from the photonic apparatus 100 in order to control an emitted beam of light to have a particular direction relative to the photonic apparatus 100.

At 720, the phase shifter 110 is adjusted according to the phase pattern/profile or relative direction indicated by the control signal. In one embodiment, the control circuitry 150 can separately tune or otherwise adjust the phase shifter 110 such that that the optical outputs 130 provide separate light waves that have distinct phases in accordance with the phase pattern/profile. In one embodiment, the control circuitry 150 controls the phase shifter 110 through thermo-optic control (e.g., the heater 120) thermally or electro-optic control to adjust the phase pattern/profile. In either case, a particular pattern/profile of phases between the respective optical outputs 130 controls, for example, a position/direction of the beam of light emitted from the photonic apparatus 100 via, for example, the optical component 140.

At 730, a light wave that is received by and is propagating within the phase shifter 110 is continuously modulated. In one embodiment, the phase shifter 110 continuously modulates a phase of the light wave by progressively changing the phase as the light wave propagates along a length of the phase shifter 110. In general, the phase shifter 110 achieves the continuous phase modulation through optical properties of the phase shifter 110 that induce the phase change. That is, in one example, by applying thermal energy along a length of the phase shifter 110, optical characteristics of the phase shifter 110 are altered such that as the light wave propagates therein a phase change is induced within the light in a continuous and progressive manner. In this way, the light wave accumulates phase change as it propagates along the phase shifter 110. Consequently, the light has a different phase at each successive location along length of the phase shifter 110.

At 740, the optical outputs 130 couple the light wave from the phase shifter 110. In one embodiment, the optical outputs 130 are evanescently coupled with the phase shifter 110 at defined locations along the phase shifter 110 that provide for coupling the light wave with particular phases relative to respective ones of the optical outputs 130. By separating the light wave onto the optical outputs with the particular relative phases, the photonic apparatus 100 can control a direction of an emitted beam of light. As an additional noted, in implementations where the phase shifter 110 is coupled with multiple different sets of optical outputs 130 and/or in implementations where individual ones of the optical outputs 130 can be separately controlled to couple light from the phase shifter 110, the control circuitry 150 can, at 740, provide control signals that activate the particular respective ones or sets of the optical outputs 130 in order to facilitate providing a particular pattern of phases.

At 750, the photonic apparatus 100 emits the separate lights waves provided via the optical outputs 130. In one embodiment, the optical component 140 is a phased-array antenna that receives the separate lights waves from the optical outputs 130 in order to emit the light waves from the photonic apparatus 100. As the lights waves with the distinct phases are emitted from the optical component 140, the light waves combine in super-position and are thus formed into the beam of light that is provided in a particular direction as a function of the relative phases of the separate light waves. In this way, the photonic apparatus 100 can control a direction of the beam of light.

As an additional note, while the blocks 610-650 are discussed in a serial manner, in various implementations, one or more of the blocks 610-650 execute in parallel. For example, blocks 610-620 may execute iteratively while blocks 630-650 execute iteratively in parallel such that the light waves provided from the optical outputs 130 are nearly continuously provided with changing phases in order to, for example, control the emitted beam of light to be directed in a sweeping or scanning motion.

FIG. 1 will now be discussed in further detail as an example environment within which the system and methods disclosed herein may operate. The photonic apparatus 100 can include one or more processors. In one or more arrangements, the processor(s) can be a main processor of the photonic apparatus 100. For instance, the processor(s) can be an electronic control unit (ECU). The photonic apparatus 100 can include one or more data stores for storing one or more types of data. The data store can include volatile and/or non-volatile memory. Examples of suitable data stores include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store can be a component of the processor(s), or the data store can be operably connected to the processor(s) for use thereby. The term "operably connected," as used throughout this description, can include direct or indirect connections, including connections without direct physical contact, electrical connections, optical connections, and so on.

The one or more data stores can include sensor data. In this context, "sensor data" refers to information produced by the photonic apparatus 100 from transmitting the beam of light and receiving responses thereto. As will be explained below, the photonic apparatus 100 can be a part of a sensor system of a vehicle or other device. The sensor system can include one or more sensors. "Sensor" means any device, component and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system includes a plurality of sensors (e.g., multiple LIDAR sensors), the sensors can function independently from each other. Alternatively, two or more of the sensors can work in combination with each other. In such a case, the two or more sensors can form a sensor network. The sensor system and/or the one or more sensors can be operably connected to the processor(s), the data store(s), and/or another element of the photonic apparatus 100 (including any of the elements shown in FIG. 1). The sensor system can acquire data of at least a portion of the external environment of the photonic apparatus 100 (e.g., nearby vehicles, obstacles).

As an example, in one or more arrangements, the sensor system can include one or more radar sensors, one or more LIDAR sensors, one or more sonar sensors, and/or one or more cameras. The processor(s), and/or the autonomous driving module(s) can be operably connected to communicate with the various vehicle systems and/or individual components thereof. For example, returning to the processor(s) and/or the autonomous driving module(s) can be in communication to send and/or receive information from the various vehicle systems to control the movement, speed, maneuvering, heading, direction, etc. of a vehicle. The processor(s), and/or the autonomous driving module(s) may control some or all of the systems of a vehicle and, thus, may be partially or fully autonomous.

The photonic apparatus 100 can include one or more modules. The modules can be implemented as computer-readable program code that, when executed by a processor, implement one or more of the various processes described herein. One or more of the modules can be a component of the processor(s), or one or more of the modules can be executed on and/or distributed among other processing systems to which the processor(s) is operably connected. The modules can include instructions (e.g., program logic) executable by one or more processor(s). Alternatively, or in addition, one or more data stores may contain such instructions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-7, but the embodiments are not limited to the illustrated structure or application.

The flowcharts and block diagrams in the figures illustrate the architecture, functionality, and operation of possible implementations of systems, methods and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g. AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A photonic apparatus, comprising:
a phase shifter that modulates a light wave propagated within the phase shifter by progressively shifting a phase of the light wave along a length of the phase shifter; and
optical outputs operably connected with the phase shifter at intervals along the length of the phase shifter, the optical outputs providing the light wave with different phases from the phase shifter that is a continuous waveguide and according to the intervals at which the optical outputs are spaced on the phase shifter in order to provide multiple outputs of the light wave at the different phases that are distinct from the phase shifter.

2. The photonic apparatus of claim 1, further comprising:
a heater that produces thermal energy and applies the thermal energy along the length of the phase shifter according to a thermal profile.

3. The photonic apparatus of claim 2, further comprising:
control circuitry operably connected with the heater and controlling the heater to produce an amount of the thermal energy as a function of an amount of phase shift that is to be induced within the light wave between the intervals, wherein the thermal profile indicates the amount of the thermal energy that is applied to induce a constant phase shift along the length.

4. The photonic apparatus of claim 2, wherein the heater is disposed proximate to the phase shifter.

5. The photonic apparatus of claim 2, wherein the heater is integrated within the phase shifter.

6. The photonic apparatus of claim 2, wherein the heater dynamically controls the phase shifter to adjust an extent of phase shift induced in the phase of the light wave by varying an amount of the thermal energy applied to the phase shifter.

7. The photonic apparatus of claim 1, wherein the phase shifter is an optical waveguide with integrated n-type and p-type doped regions within the optical waveguide to induce a continuous phase shift along the optical waveguide in a phase of the light wave when a bias current is applied to the phase shifter.

8. The photonic apparatus of claim 1, further comprising:
a source optical waveguide operably connected with a light source that provides the light wave over the source optical waveguide, wherein the phase shifter progressively shifts the light wave by continuously modulating the light wave according to a constant amount of phase shift along the length to provide the light wave with a distinct phase at successive locations along the length.

9. The photonic apparatus of claim 1, wherein the photonic apparatus is integrated within a phased array light detection and ranging (LIDAR) device, wherein the optical outputs are evanescently coupled to the phase shifter to couple the light wave from the phase shifter while avoiding attenuating the light wave, and wherein the optical outputs are operably connected with a phased array antenna of the LIDAR device to emit a beam of light in a selected direction.

10. The photonic apparatus of claim 1, wherein the continuous waveguide of the phase shifter is an optical waveguide that is thermo-optically controlled to have a thermal profile along the length that provides for a constant change in the phase of the light wave as the light wave propagates along the phase shifter.

11. An optical device, comprising:
an optical waveguide operably connected with a light source, the optical waveguide modulating a light wave from the light source, the optical waveguide being a continuous waveguide;
optical outputs operably connected with the optical waveguide at intervals along a length of the optical waveguide, the optical outputs coupling the light wave from the optical waveguide at the intervals to produce a plurality of light waves with different characteristics including at least different phases that are distinct at respective ones of the optical outputs and as a function of the modulating by the optical waveguide; and
a heater that produces thermal energy and applies the thermal energy to the optical waveguide.

12. The optical device of claim 11, wherein the different characteristics are distinct phases between the plurality of light waves, wherein the optical waveguide is a phase shifter that progressively modulates the light wave by continuously shifting a phase of the light wave along a length of the optical waveguide, and
wherein the optical waveguide produces a distinct phase of the light wave at successive ones of the intervals associated with the optical outputs to generate the plurality of light waves.

13. The optical device of claim 12, wherein the phase shifter modulates the light wave according to a thermal profile that indicates an amount of the thermal energy that is applied to induce a constant phase shift along the length.

14. The optical device of claim 11, further comprising:
control circuitry operably connected with the heater and dynamically controlling the heater to produce an amount of the thermal energy as a function of an amount of phase shift that is to be induced within the light wave between the intervals.

15. The optical device of claim 11, wherein the optical outputs are evanescently coupled to the optical waveguide to couple the light wave from the optical waveguide while avoiding attenuating the light wave.

16. The optical device of claim 11, wherein the heater is integrated with the optical waveguide and includes n-type and p-type doped regions within the optical waveguide to generate a thermal profile along the optical waveguide that continuously shifts a phase of the light wave between the intervals at which the optical outputs are spaced.

17. A method for dynamically controlling a continuous phase shifter, comprising:
in response to an electronic control signal that indicates a requested direction in which to steer a beam of light, adjusting, using a heater operably connected with the continuous phase shifter, an amount of thermal energy provided to the continuous phase shifter that is a continuous waveguide;
continuously modulating a phase of a light wave as the light wave propagates along a length of the continuous phase shifter as a function of the thermal energy to provide the light wave having different phases along the length; and
coupling, from the continuous phase shifter via optical outputs spaced at intervals along the continuous phase shifter, a plurality of distinct waves with distinct phases that are the different phases formed by the optical outputs coupling the light wave at the intervals from the continuous phase shifter.

18. The method of claim 17, wherein continuously modulating the light wave includes progressively modulating a phase of the light wave according to a constant amount of phase shift induced by the continuous phase shifter as the light wave propagates along the continuous phase shifter.

19. The method of claim 17, wherein adjusting the amount of thermal energy changes a refractive index of the continuous phase shifter.

20. The method of claim 17, further comprising:
emitting the distinct waves from a photonic device to generate the beam of light that is directed in the requested direction.

* * * * *